April 28, 1936.                H. E. TAUTZ                2,038,810
                          CIRCULAR SAW MACHINE
                    Filed Sept. 6, 1934        2 Sheets-Sheet 1
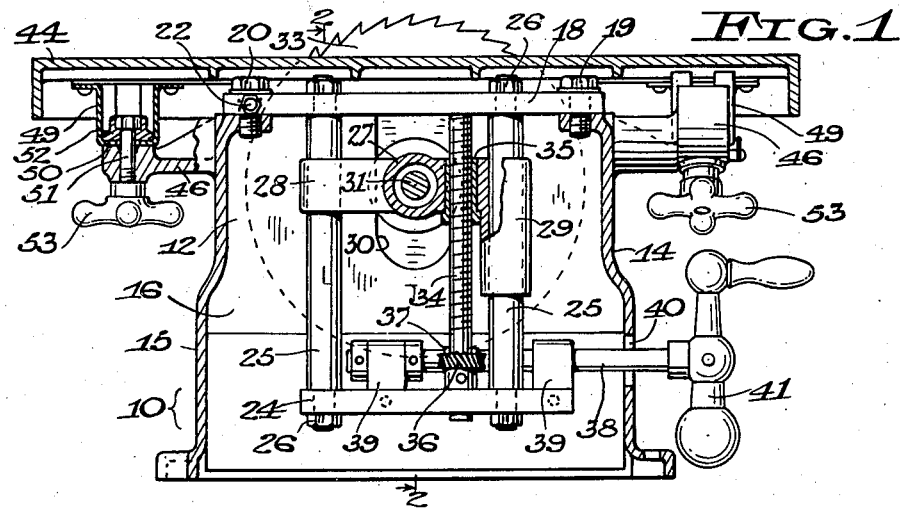
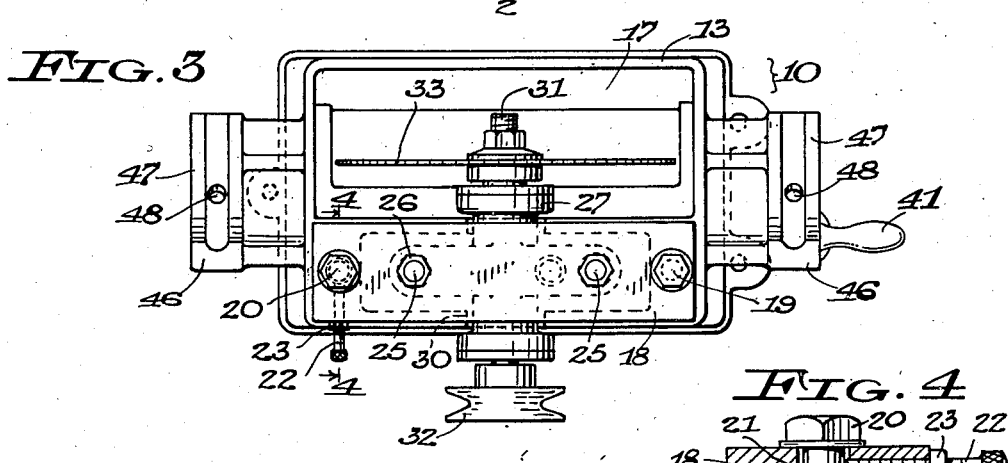
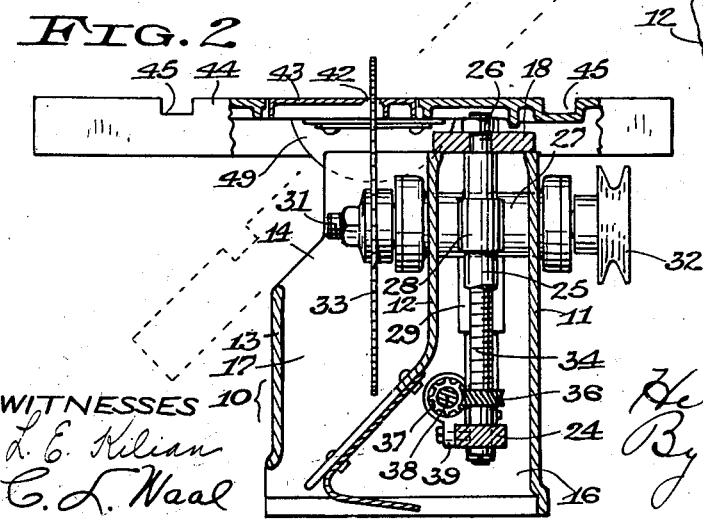
INVENTOR
Herbert E. Tautz
By
ATTORNEY
WITNESSES April 28, 1936.  H. E. TAUTZ  2,038,810
CIRCULAR SAW MACHINE
Filed Sept. 6, 1934  2 Sheets-Sheet 2
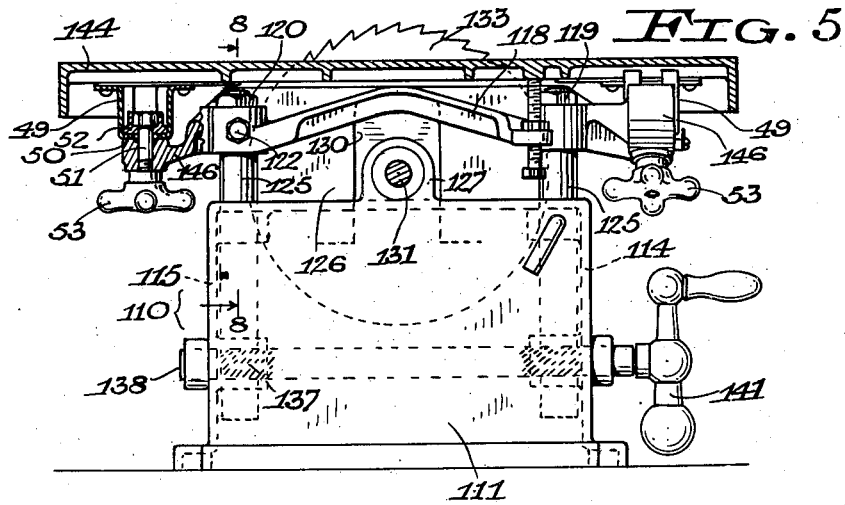
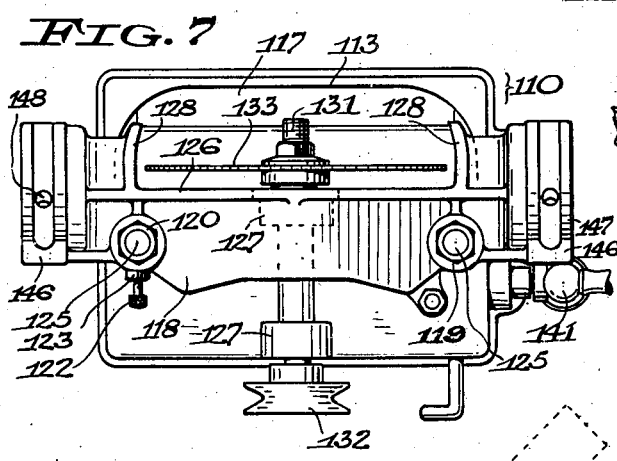
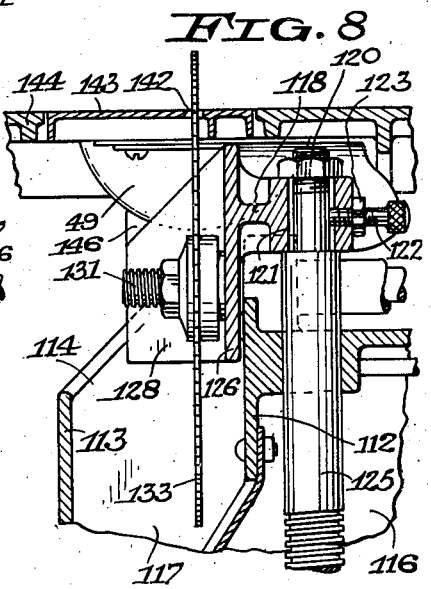
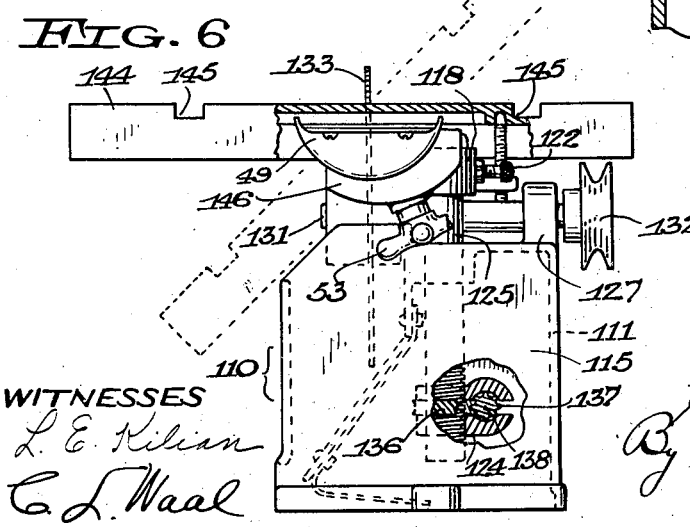
INVENTOR
Herbert E. Tautz
By R. S. Caldwell
ATTORNEY
WITNESSES
L. E. Kilian
C. L. Waal Patented Apr. 28, 1936

2,038,810

UNITED STATES PATENT OFFICE 2,038,810

CIRCULAR-SAW MACHINE

Herbert E. Tautz, Milwaukee, Wis., assignor to The Delta Manufacturing Company, Milwaukee, Wis., a corporation of Wisconsin Application September 6, 1934, Serial No. 742,881

11 Claims. (Cl. 143—33)

The invention relates to circular-saw machines and the like.

In a circular-saw machine it is necessary to have the plane of the saw blade in parallel relation to the direction of work travel, which travel is determined by guide surfaces such as gage grooves in the saw table.

An object of the present invention is to provide simple and inexpensive means whereby the relative position of the saw with respect to the table can be readily and accurately adjusted so as to insure parallelism between the plane of the saw and the direction of work travel, notwithstanding variations in manufacture.

Another object of the invention is to facilitate assembly and adjustment of the machine by providing an arbor-carrying frame which can be easily secured to the base or standard of the machine, the frame carrying means for adjusting the elevation of the saw arbor.

The invention further consists in the several features hereinafter described and claimed.

In the accompanying drawings, which show two embodiments of the invention,

Fig. 1 is a sectional elevation of one form of circular-saw machine constructed in accordance with the invention;

Fig. 2 is a sectional view taken on the line 2—2 of Fig. 1;

Fig. 3 is a top plan view of the machine with the table removed;

Fig. 4 is a sectional view taken on the line 4—4 of Fig. 3;

Fig. 5 is an elevation, partly in section, of another form of machine;

Fig. 6 is a rear end view of the machine of Fig. 5, parts being broken away and parts being shown in section;

Fig. 7 is a top plan view of the machine of Fig. 5, the table being removed, and Fig. 8 is a sectional view taken on the line 8—8 of Fig. 5.

In that form of the invention shown in Figs. 1 to 4, 10 designates a supporting base or standard having spaced upright walls 11, 12, and 13, connected by end walls 14 and 15, thereby forming a housing with two laterally adjacent chambers 16 and 17, the latter being a saw chamber and sawdust chute.

The chamber 16 opens at the upper end of the standard and is closed by a flat horizontal metal plate 18 resting on the machined horizontal top surface of the standard. The plate 18 is secured at opposite ends to the standard by screws 19 and 20 threaded into the standard. The screw 20 passes through an opening 21 in the plate, as seen in Fig. 4, the opening being somewhat larger than the diameter of the bolt so as to permit lateral adjustment of the plate, the other end of the plate pivoting on the screw 19. Fine adjustment of the plate 18 is effected by a horizontal set-screw 22 threaded in the plate and bearing against the screw 20, the set-screw being provided with a lock-nut 23.

The plate 18 forms the top member of a frame which comprises a horizontal bottom bar 24 connected to the plate by a pair of spaced vertical rods 25, the latter having reduced threaded ends passing through the plate and bar and secured thereto by nuts 26.

A bearing bracket 27, preferably of die-cast construction, has apertured lateral extensions 28 and 29 slidably fitting on the vertical rods 25, and extends through slots 30 formed in the casing walls 11 and 12, the slots opening at the upper surface of the standard. A horizontal saw arbor 31 is journalled in the bearing bracket 27 and carries a pulley 32 at one end and a circular saw 33 at the other end, the saw being placed in the saw chamber 17.

The elevation of the saw arbor is adjusted by a vertical screw-shaft 34 threaded through a bushing 35 in the bracket 27. The upper end of the screw-shaft bears against the lower face of the plate 18 and the bottom end portion of the screw-shaft is journalled in the bottom bar 24. A gear 36 secured to the lower portion of the screw shaft rests on the bar to support the shaft, and meshes with a gear 37 on a horizontal shaft 38. The shaft 38 is journalled in bearing members 39 secured to the bottom bar 24 and extends through a somewhat larger opening 40 in the end wall 14 of the standard, the outer end of the shaft carrying a hand-crank 41. The rotation of the hand-crank serves to turn the vertical screw-shaft 34 through the connected gearing, thereby changing the elevation of the arbor-carrying bracket 27.

The circular saw 33 is disposed in a vertical plane and projects through a slot 42 in a soft metal insert plate 43 of a saw table 44. The saw table is provided with the usual gage grooves 45 and is secured to the base or standard 10, preferably in a manner permitting the table to be tilted. In the present instance, the base or standard 10 is formed at opposite ends with trunnion brackets 46 each having an arcuate saddle-forming bearing face 47 and a radial bore 48. Semi-circular sheet metal trunnions 49 are secured to the under-side of the saw table 44 and rest on the trunnion brackets, the tilting axis preferably being in the plane of the saw and adjacent the plane of the top surface of the table. The trunnions are arranged in pairs and have peripheral flanges 50 resting on the trunnion brackets, the flanges being spaced to admit a clamping bolt 51 between them. The head of the bolt is non-rotatably seated in a clamping member 52 engaging the inner faces of the trunnion flanges 50, and the shank of the bolt passes through the bore 48 in the trunnion bracket, a clamping hand-wheel nut 53 being threaded on the bolt.

The arbor-carrying bracket 27 and the frame on which it is mounted form a unit assembly which is easily secured to the base or standard 10 by merely omitting the hand-crank 41, inserting the frame into the standard from above by a combined turning and lowering movement, and applying the screws 19 and 20, the hand-crank 41 being then attached to the shaft 38. When inserting the frame, the outer end of the shaft 38 is first introduced into the standard. The removal of the frame is equally simple.

In order to adjust the saw so that it will be parallel to the direction of work travel, the arbor-supporting frame is swung laterally about the screw 19, fine adjustment being effected by the set-screw 22 engaging the screw 20. When the proper adjustment is reached, the screws 19 and 20 are tightened. By means of this construction, manufacture and assembly are facilitated, and accurate positioning of the saw is made possible notwithstanding variations in manufacture.

In that form of the invention shown in Figs. 5 to 8, 110 designates a base or standard having spaced upright walls 111, 112, and 113, connected by end walls 114 and 115, thereby forming two laterally adjacent chambers 116 and 117, the latter being a saw chamber and sawdust chute.

The upper portion of the standard is provided with spaced lugs 127 in which a horizontal saw arbor 131 is journalled, the arbor carrying a pulley 132 at one end and a circular saw 133 at the other end, the saw being placed in the saw chamber 117.

A pair of spaced vertical rods 125 are slidably mounted in the standard and have reduced upper ends passing through a trunnion support or yoke 118 to which they are secured by nuts 119 and 120. The reduced end of one of the rods passes through an opening 121 in the support, as seen in Fig. 8, the opening being somewhat larger than the rod end so as to permit lateral adjustment of the support, the other end portion of the yoke pivoting on the other rod end. Fine adjustment of the support is effected by a horizontal set-screw 122 threaded in the support and bearing against the rod end, the set-screw being provided with a lock-nut 123.

The elevation of the trunnion support is adjusted by nut-forming gears 136 threaded on the rods 125 and meshing with gears 137 formed on a horizontal shaft 138 journalled in the end walls of the standard 110, one end of the shaft carrying a hand-crank 141. The nut-forming gears 136 are confined against axial movement by apertured lugs 124 on the standard or base, the lugs also forming guides for the rods. The rotation of the hand-crank serves to vertically shift the rods 125 through the connected gearing, thereby changing the elevation of the trunnion support or yoke.

The trunnion support or yoke is provided with a skirt 126 interposed between the saw and the base wall 112, the skirt having a slot 130 to pass the saw arbor and having spaced flanges 128 between which the saw is placed.

The circular saw 133 is disposed in a vertical plane and projects through a slot 142 in a soft metal insert plate 143 of a saw table 144. The saw table is provided with the usual gage grooves 145 and is secured to the support or yoke 118, preferably in a manner permitting the table to be tilted. In the present instance, the support or yoke is formed at opposite ends with trunnion brackets 146 each having an arcuate saddle-forming bearing face 147 and a radial bore 148. The table is provided with trunnions 49, as in the Fig. 1 device, secured to the trunnion brackets 146 in the same manner.

In order to adjust the saw 133 so that it will be parallel to the direction of work travel, the support or yoke 118 is swung laterally about the reduced end of the front rod 125, fine adjustment being effected by the set-screw 122 engaging the rear rod 125. When the proper adjustment is reached, the nuts 119 and 120 are tightened. The saw may thus be accurately positioned notwithstanding variations in manufacture.

For the purpose of illustration, two embodiments of the invention have been disclosed, in one of which the saw arbor is adjusted with respect to the table, and in the other of which the table is adjusted with respect to the saw arbor. In either case an adjustment is effected so that the direction of work travel will be parallel to the plane of the saw or at right-angles to the axis of the arbor. While the invention is here shown to be embodied in a circular-saw machine, it is also applicable to other machine tools.

What I claim as new and desire to secure by Letters Patent is:

1. In a wood-working machine, the combination of a base, a cutter arbor rotatably carried by said base, a table support secured to said base and angularly adjustable thereon in a lateral direction for varying the direction of work travel with respect to said arbor, and a work table secured to said support and angularly movable with respect to said support about an axis substantially parallel to the direction of work travel.

2. In a wood-working machine, the combination of a base, a frame having a top member and parallel vertical guides, a bearing member slidably mounted on said guides, a cutter arbor rotatably carried by said bearing member, means carried by said frame for adjusting the elevation of said bearing member, fastening elements for securing said top member to said base, said top member having a relative lateral movement with respect to one of said fastening elements for angularly adjusting said frame with respect to said base, and a work table carried by said base.

3. In a wood-working machine, the combination of a base, a trunnion support vertically movable on said base, a work table trunnioned on said support and having a work-guiding surface, a saw arbor having a mounting on said base, and means for angularly adjusting said support with respect to said base to effect parallelism between the plane of the saw and the work-guiding surface.

4. In a wood-working machine, arbor-supporting means comprising a mounting member having spaced apertures, fastening members received in said apertures, said mounting member being pivoted on one of said fastening members, and the other fastening member passing loosely through its aperture, a set-screw in said mounting member engaging said last-named fastening member to angularly displace said mounting member, and clamping means for said fastening members.

5. In a wood-working machine, the combination with a work table and cutter arbor, of means for adjusting the relative angular position of said table and arbor comprising a member having spaced apertures, fastening members received in said apertures and having a releasable clamping engagement with said first-named member, said first-named member being pivoted on one of said fastening members and the other fastening member passing loosely through its aperture, and a set-screw in said first-named member engaging said last-named fastening member to angularly displace said member.

6. In a wood-working machine, the combination with a work table and cutter arbor, of means for adjusting the relative angular position of said table and arbor comprising a pair of parallel rods, supporting means in which said rods are slidable, a cross member connecting said rods and pivoted on one of said rods, said cross member having relative lateral play with respect to the other rod, a set-screw in said cross member adjacent said last-named rod for angularly displacing said cross member, and clamping means for securing said cross member to said rods in angularly adjusted position.

7. In a wood working machine, the combination of a housing, a frame insertable into said housing and having a mounting member, a work table secured to said housing, means for adjustably securing said mounting member to said housing, and a cutter arbor carried by said frame and adjustable in angular position with respect to said housing and table by shifting said mounting member.

8. In a wood-working machine, the combination of a housing having an opening, a work table secured to said housing, a frame insertable into said housing through said opening and including a cover member for said opening, means for adjustably securing said cover member to said housing, and a cutter arbor carried by said frame and adjustable in angular position with respect to said housing and table by shifting said cover member.

9. In a wood-working machine, the combination with a work table and cutter arbor, of means for adjusting the relative angular position of said table and arbor comprising a pair of pivotally connected members, means for releasably clamping said members adjacent their pivotal axis, at least one of said members having an aperture spaced from said pivotal axis, the other member having a fastening element entering loosely in said aperture, said fastening element effecting a releasable clamping engagement of said members, and a set-screw in said apertured member engageable with said fastening element to effect relative angular displacement of said members.

10. In a wood-working machine, the combination of a supporting member, a cutter arbor rotatably carried by said supporting member, a table-engaging member secured to said supporting member and angularly adjustable thereon in a lateral direction for varying the direction of work travel with respect to said arbor, and a work table secured to said table-engaging member and relatively angularly movable with respect to said table-engaging member about an axis substantially parallel to the direction of work travel.

11. In a wood-working machine, the combination of a supporting member, a frame having a guide portion, a bearing member slidably mounted on said guide portion, a cutter arbor rotatably carried by said bearing member, means for adjusting the elevation of said bearing member on said guide portion, fastening elements for securing said frame to said supporting member, said frame having a relative lateral movement with respect to one of said fastening elements for angularly adjusting said frame with respect to said supporting member, and a work table secured to said supporting member.

HERBERT E. TAUTZ.